381
1/85 OR 4,518,852
SR

United States Patent [19]
Stockburger et al.
[11] Patent Number: 4,518,852
[45] Date of Patent: May 21, 1985

[54] METHOD FOR OPERATING AUTOMATIC DEVICES SUCH AS CASH REGISTERS OR THE LIKE AND A DEVICE FOR CARRYING OUT THE METHOD

[76] Inventors: Hermann Stockburger, Kirnachweg 7, D-7742 St. Georgen; Hans-Georg Winderlich, Niedere Strasse 36, D-7730 VS-Villingen, both of Fed. Rep. of Germany

[21] Appl. No.: 442,225
[22] PCT Filed: Mar. 23, 1982
[86] PCT No.: PCT/EP82/00059
§ 371 Date: Nov. 8, 1982
§ 102(e) Date: Nov. 8, 1982
[87] PCT Pub. No.: WO82/03289
PCT Pub. Date: Sep. 30, 1982
[30] Foreign Application Priority Data
Mar. 23, 1981 [DE] Fed. Rep. of Germany ....... 3111355
[51] Int. Cl.³ ............ G06F 7/08
[52] U.S. Cl. ............ 235/381; 235/383; 364/405
[58] Field of Search ............ 235/380, 381, 383, 385; 364/404, 405

[56] References Cited

U.S. PATENT DOCUMENTS 3,637,989 1/1972 Howard et al. .................... 235/383
3,790,754 2/1974 Black et al. .................... 235/380
4,180,206 12/1979 Takahashi et al. .................... 235/419
4,218,011 8/1980 Simjian .................... 235/375
4,249,071 2/1981 Simjian .................... 235/375
4,419,738 12/1983 Takahashi et al. ............ 364/405 X

FOREIGN PATENT DOCUMENTS 0020158 12/1980 European Pat. Off. .
2726860 3/1978 Fed. Rep. of Germany .
2027912 2/1980 New Zealand .

*Primary Examiner*—David L. Trafton
*Attorney, Agent, or Firm*—Donald Brown; Robert M. Asher

[57] ABSTRACT

A method is created in which parameters such as, for example, the prices can be set by the operator. So that the parameter is changed accurately in a predetermined manner, the command for setting the parameter is input into a computer of the device by means of a data carrier which cannot be altered by the operator with respect to the command. The operator has no further personal influence on the parameter setting and this makes intentional or unintentional errors impossible. The device comprises a computer (2) and a read-write device (3) for reading data written on a data carrier (4) into the computer (2). The command for parameter setting is applied to a magnetic track (5) of the data carrier and is read out by means of a read device and fed to the computer where a parameter setting takes place.

6 Claims, 2 Drawing Figures

METHOD FOR OPERATING AUTOMATIC DEVICES SUCH AS CASH REGISTERS OR THE LIKE AND A DEVICE FOR CARRYING OUT THE METHOD

The invention relates to a method for operating automatic devices such as cash registers or the like, in which parameters such as, for example, the prices can be set by the operator.

In particular in the case of automatic cash registers for goods and/or services, the prices for certain goods and/or services are set by setting coding switches provided in the interior of the cash register. Especially in the case of those cash registers which are used in chain-stores it is desirable that the setting and any change in the price setting which may become necessary should be undertaken only by a person authorised to do so, and that all settings to be carried out are also actually done at a certain time, since correct accounting can be achieved only in this manner. It is further desirable that it can be determined as to what extent goods are affected by a parameter change, that is to say price change, to be carried out, so that manipulations for instance by a branch manager can be made impossible.

This object is achieved by means of a method of the type described initially, which, according to the invention, is characterised in that the command for setting a parameter is entered into a computer of the device by means of a data carrier which cannot be altered by the operator with respect to the command.

The device for carrying out the method comprises a computer and a read device for reading data written on a data carrier into the computer and, according to the invention, is characterised in that the control circuit of the computer is constructed in such a manner that parameters can be set by means of a data carrier which cannot be altered by the operator with respect to the command for changing a parameter.

Figure 1:
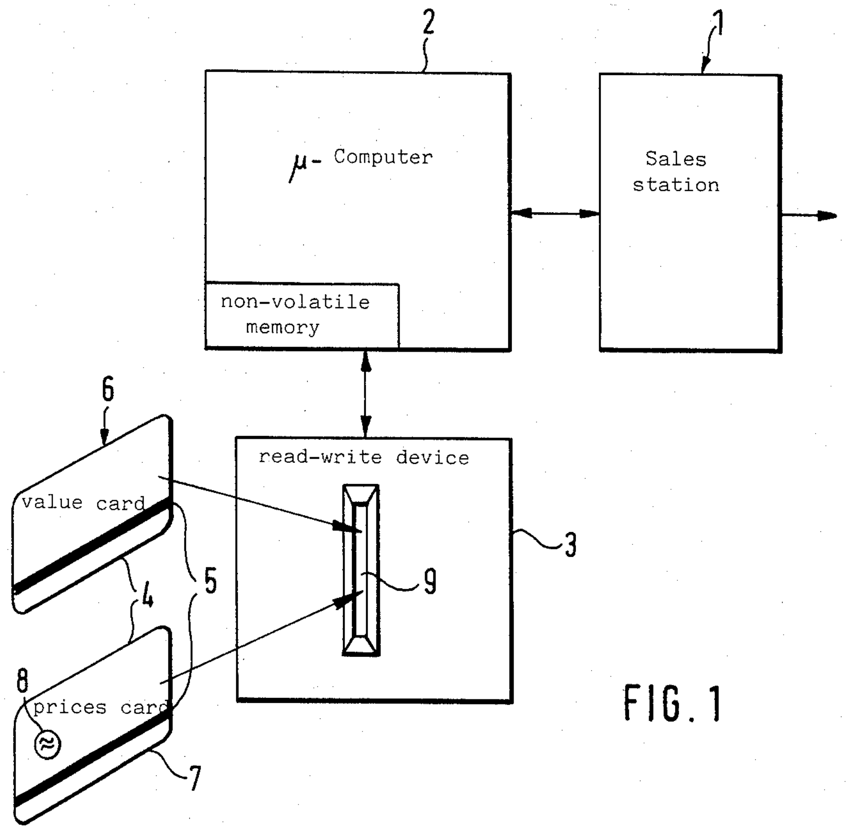
Figure 2:
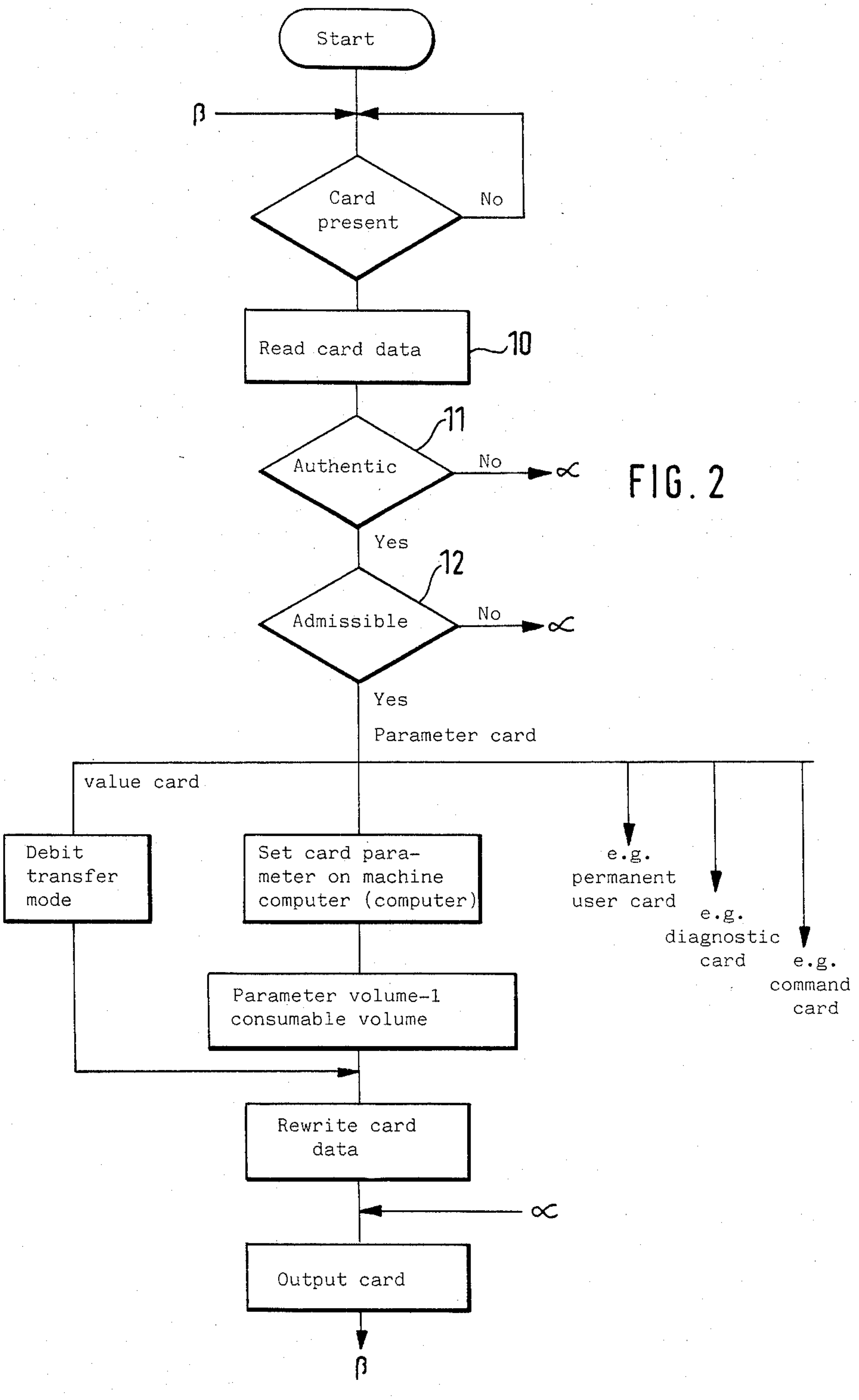

Further features and suitable characteristics of the invention are evident from the description of an illustrative embodiment with reference to the figures, in which:

FIG. 1 shows the diagrammatic configuration of a device for carrying out the method; and FIG. 2 shows a diagram for explaining the method.

The automatic device comprises a sales station 1 into which the goods and/or services to be calculated is entered in a known manner via a keyboard or a device which, for example, reads out an EAN code of the item of goods and/or service. The sales station is connected to a micro-computer 2 provided with a ROM memory and a RAM memory. The RAM memory is preferably constructed as a non-volatile memory. The micro-computer 2 is connected to a read-write device 3. The read-write device comprises a pull-in mechanism for pulling in a data carrier 4 which is constructed in the form of a card with a magnetic track 5. In addition, the read-write device 3 comprises a device for reading out the data written onto the magnetic track and for checking the data carrier for authenticity and for the authority of the user, and for writing data into the data carrier.

The control circuit, which is essentially formed by the ROM memory, of the micro-computer 2 is constructed in such a manner that, when a certain item of goods and/or service is entered into the sales station 1, the purchaser is charged a certain price, for example by outputting a bill. Simultaneously, the stock on hand is reduced by the outgoing. The goods or services issued are preferably paid by means of a value card 6 which is input into the read-write device 3. The value presented by the value card is read out and the value reduced by the purchase is written in in a known manner.

If now for instance in the branches of a chain store the price for a certain item of goods and/or a certain service is to be changed as from a certain day, the branch receives a data carrier 4 in the form of a prices card 7. This prices card contains written onto the magnetic track 5 the command by means of which the parameter of the programme, for determining the prices, contained in the RAM memory is changed. The prices card comprises an individualising mark 8 which can be set by the operator. The operator uses the individualising mark 8 first to set a code which characterises the personal identification and then introduces the prices card into the read-write device 3. There the command is read out which causes the prices, to be used in furture for the goods or services, to be changed as desired. Apart from the commands for changing the parameters, the magnetic track also contains coded data for verifying the authenticity of the prices card and for checking the identity of the user with that of the intended user by means of the setting on the individualising mark 8. A change in parameters takes place only if the data written in also show that the card is genuine and that the user is indeed an authorised user. After the command for changing the parameters has been read out, the point in time, that is to say the time of day and the date of reading out the command is written onto the magnetic track 5 of the prices card 7 by means of the read-write device 3. In addition, the stock of goods, the price of which is the subject of the command change, available at the time of the reading-out of the command is preferably written in. Thus the prices card 7 represents an acknowledgement mark of the fact that the parameter has been changed. The office issuing the commands can thus satisfy itself as to correct completion of the procedure, and manipulations are made impossible.

As can be seen in particular from FIG. 2, the method proceeds in detail as follows:

The prices card 7 is introduced into a slot 9 of the read-write device. This initiates the control process which is essentially determined by the ROM memory in the micro-computer 2. The card information is read out by means of a read-write facility 10 in the read-write device. The data are fed to a comparator 11 which checks the authenticity of the card by comparing characteristics which individualise the card 8 with the coded data read into the magnetic track. If authenticity is not established, the card is returned and the device returns to the state of operational readiness. If the authenticity of the card is confirmed, a comparator 12 compares the personal code specified by the setting of the individualising mark 8 with the code resulting from the entry on the magnetic track. If agreement is not established, the card is returned and the device returns to the state of operational readiness. If, however, the agreement shows that the user is actually the authorised person, the command resulting from the entry on the magnetic track 5 is read into the non-volatile memory and this causes certain parameters, for example prices for certain goods and/or services to be changed or to be reentered or to be wholly cancelled.

In the magnetic track 5 of the prices card 7 a number, hereinafter called the parameter volume, is preferably entered which determines in how many such devices and, in particular, in how many such cash registers parameters such as, for example, the prices can be or should be changed. After the command has been executed, the computer therefore outputs a signal to the read-write device by means of which the parameter volume read in, reduced by the number 1, is once again written into the magnetic track. Subsequently, the time of execution of the command and the volume of goods which is affected by the change in prices are written in and the card is then output again and the device is returned to operational readiness. The changed prices are then applied to each subsequent sale of goods and/or services.

In the above illustrative embodiment the invention has been explained with the aid of a change in tariffs and, in particular, of prices. In principle, other parameter changes are also possible with the invention, for example the input of certain diagnostic commands by means of a diagnostics card.

We claim:

1. A cash register apparatus comprising:

a computer having a memory for storing price parameters for goods and/or services; and a read-write device connected with said computer, said read-write device including means for reading a card-like data carrier, means for checking said data carrier for authenticity, and means for reading a value card presented for a purchase operation and for reading a prices card comprising information for determining said price parameters in said memory, whereby said single read-write device can handle said value card and said prices card to perform a purchase operation and a price determining operation.

2. The cash register apparatus of claim 1, further comprising means for writing on said data carrier, said writing means being adapted to write onto said prices card data indicating the reading of said information for determining said price parameter.

3. The cash register apparatus of claim 2 wherein said writing means are adapted to record on said prices card a volume which can be affected by the parameter to be set and which is stored in said memory.

4. The cash register apparatus of claim 1 wherein said writing means are adapted to reduce the value presented by said value card by the amount of the purchase.

5. A cash register apparatus comprising:

a computer having a memory for storing price parameters for goods and/or services; and a read-write device connected with said computer, said read-write device including means for reading a card-like data carrier for authenticity and means for writing on said data carrier, wherein said reading means is adapted to read a value card presented for a purchase operation and to read a prices card comprising information for determining said price parameters in said memory, and said writing means is adapted to write onto said value card data indicating said purchase operation and onto said prices card data indicating the reading of said information for determining said price parameters, whereby said value card and said prices card can be handled to perform a purchase operation and a price determining operation by a single read-write device.

6. The cash register apparatus of claim 5, wherein said writing means are adapted to record on said prices card a volume which can be affected by the parameter to be set and which is stored in said memory.

* * * * *